United States Patent
Yamazaki et al.

[11] Patent Number: 5,884,189
[45] Date of Patent: Mar. 16, 1999

[54] MULTIPLE-MODES ADAPTABLE RADIOTELEPHONE

[75] Inventors: Seiichi Yamazaki; Sumio Endo, both of Kanagawa, Japan

[73] Assignee: Matsushita Electric Industrial Co., Ltd., Osaka, Japan

[21] Appl. No.: 910,721

[22] Filed: Aug. 13, 1997

[30] Foreign Application Priority Data

Aug. 23, 1996 [JP] Japan ................................. 8-240025

[51] Int. Cl.⁶ ........................................................ H04B 1/38
[52] U.S. Cl. ........................................... 455/552; 455/575
[58] Field of Search ..................................... 455/552, 422, 455/426, 74, 553, 462, 465, 575

[56] References Cited

U.S. PATENT DOCUMENTS

| | | | |
|---|---|---|---|
| 5,353,331 | 10/1994 | Emery et al. | 455/461 |
| 5,406,615 | 4/1995 | Miller et al. | 455/552 |
| 5,594,782 | 1/1997 | Zicker et al. | 455/417 |

FOREIGN PATENT DOCUMENTS 0 656 735 A2  11/1994  European Pat. Off. .
2 271 917  12/1992  United Kingdom .

OTHER PUBLICATIONS

Padgett et al., Overview of Wireless Personal Communications, IEEE Communications Magazine, vol. 33, No. 1, Jan. 1995, pp. 28–41.

TIA/EIA Interim Standard, Mobile Station—Land Station Compatibility Specification for Analog Cellular Auxiliary Personal Communications Service, TIA/EIA/IS–94, May 1994, Telecommunications Industry Association.

*Primary Examiner*—Thanh Cong Le
*Attorney, Agent, or Firm*—Pearne, Gordon, McCoy & Granger LLP

[57] ABSTRACT

A multiple-modes adaptable radiotelephone adaptable to multiple communication modes, which is communicable with any of a cellular phone, cordless telephone and PCS telephone. The radiotelephone includes a single wireless transceiver for modulating and demodulating signals in the transmitting/receiving frequency bands of a cellular telephone system and a cordless telephone system. The transmitting/receiving frequency bands of the cordless telephone system are located closed to those of the cellular telephone system. A control unit, which has a PCS software installed therein, is provided for controlling the wireless transceiver.

2 Claims, 2 Drawing Sheets

MULTIPLE-MODES ADAPTABLE RADIOTELEPHONE

BACKGROUND OF THE INVENTION

The present invention generally relates to a multiple-modes adaptable telephone which is adaptable to multiple telephone communication modes, and more particularly to a technique for realizing the functions concerning multiple communication modes by a single telephone containing a single wireless machine.

A multi-phone-system telephone, disclosed in U.S. Pat. No. 4,989,230 (Jan. 29, 1991), is known as a telephone operable in both the cellular telephone and the cordless telephone. This telephone, as shown in FIG. 4, is made up of a cellular antenna 41 for transmitting and receiving a radio wave of a frequency within the frequency band (transmitting frequencies: 824.04 MHz to 848.9 MHz, and receiving frequencies: 869.04 MHz to 893.97 MHz) of the cellular telephone system, a cellular wireless transceiver 43 for modulating a transmitting signal into a signal of a frequency within the cellular transmitting frequency band, and demodulating a receiving signal of a frequency within the cellular receiving frequency band, a cordless antenna 42 for transmitting and receiving a radio wave of a frequency within the frequency band (250/400 MHz) of the cordless telephone system, a cordless wireless transceiver 44 for demodulating a signal of a frequency within the cordless receiving frequency band, a control unit 45 for controlling the operations of the cellular wireless machine 43 and the cordless wireless machine 44 according to the systems of the cellular and cordless telephones, a display 46 for displaying a status of the telephone, an operation unit 47 for various input operations, a speaker 48 for generating a voice, and a microphone 49 for entering a voice into the telephone.

The multi-phone-system telephone has a cellular telephone number. Mainly in the outdoors, a calling telephone sets up a channel to a called telephone, by using the telephone number, by way of a base station in the cellular telephone system. The calling telephone communicates with the called one by using the cellular antenna 41 and the cellular wireless machine 43. Mainly indoors, by a telephone number of a cordless master station installed in the home and connected to the landline, for example, a calling telephone sets up a channel to a called telephone by way of the master station, and communicates with the called telephone by using the cordless antenna 42 and the cordless wireless machine 44.

The prior art telephone is equipped with two wireless transceiver for the cellular telephone system and the cordless telephone system. The wireless transceiver inevitably occupy a large part of the housing of the telephone. This makes it difficult to reduce the size and weight of the telephone, and hinders the reduction of cost to manufacture.

Recently, in the United States, there is a telephone service based on the personal communication system (PCS) designed according to IS-94. In the telephone service, a telephone is used, by using a single telephone number, in a manner that in the outdoors, it is used as a cellular telephone, and in the office, for example, it is communicable with a called telephone by way of a small base station. The conventional multi-phone-system telephone does not have the function of the PCS telephone, however.

In the United States, various types of telephone services are thus provided to users successively. Infrastructures of these services are different. Because of this, when the user wants to uses a telephone service, he must use a telephone adaptable to that telephone service. When another telephone service is used, another telephone adaptable to that telephone service must be used. This is very inconvenient to telephone users. It is ideal that one telephone terminal to which the user is accustomed may be used from many places, for example, the office, home and vehicle. The telephone using the combination of the wireless transceiver of different telephone systems is disadvantageous in that the size and weight of the telephone is increased. In this respect, this type of telephone cannot meet the demand of the user.

SUMMARY OF THE INVENTION

Accordingly, an object of the present invention is provide a multiple-modes adaptable telephone which adaptable to the communication modes of a cellular telephone system, a cordless telephone system and a personal communication system.

In the multiple-modes adaptable telephone of the present invention, the frequency bands located near to the transmitting/receiving frequency bands of the cellular telephone is used for the transmitting/receiving frequency bands of the cordless telephone. With this, signals whose frequencies are within the transmitting/receiving frequency bands of the cellular and the cordless telephone can be modulated and demodulated by a single wireless transceiver. A PCS software is installed in the control unit for controlling the wireless transceiver.

A telephone containing a single wireless transceiver is adaptable to the communication modes of a cellular telephone system, a cordless telephone system and a personal communication system.

In accordance with a first aspect of the present invention; defines a multiple-modes adaptable telephone adaptable to multiple communication modes comprising: a single wireless transceiver for modulating and demodulating signals in the transmitting/receiving frequency bands of a cellular telephone system and a cordless telephone system of which the transmitting/receiving frequency bands are located close to those of the cellular telephone system; a control unit for controlling the wireless transceiver; and a PCS software being installed in the control unit; whereby the multiple-modes adaptable telephone is communicable with any of the cellular telephone, cordless telephone and PCS telephone. Therefore, the invention enables a single telephone terminal to use many telephone services at many places, for example, in the home, office and car.

In accordance with a second aspect, the present invention; defines the multiple-modes adaptable telephone such that the wireless transceiver modulates and demodulates signals in the transmitting/receiving frequency bands of the AMPS cellular telephone and the ISM band cordless telephone, and a software designed according to IS-94 is installed in the control unit. Therefore, a combination of hardware and software realizes a small and light telephone based on three wireless telephone specifications.

DETAILED DESCRIPTION OF THE PREFERRED EMBODIMENTS

The preferred embodiment of the present invention will be described here after with reference to FIGS. 1 through 3.

Figure 1:
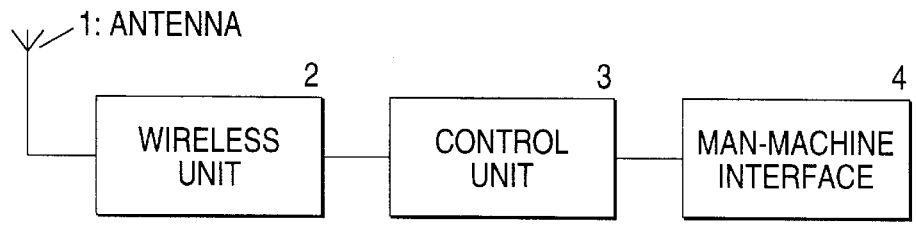
FIG. 1 is a block diagram showing an arrangement of a multiple-modes adaptable telephone according to the present invention.

A multiple-modes adaptable telephone embodying the present invention, as shown in FIG. 1, is made up of an antenna 1 for capturing a radio wave in a free space and radiating a high frequency signal, generated by a telephone terminal, into the free space, a single wireless unit 2 for performing necessary signal processings of audio and data signals received or to be transmitted, for example, frequency converting and amplifying those signals, a control unit 3 for controlling the wireless unit 2 and processing information received or to be transmitted in analog and digital fashions, and a man-machine interface 4 including a microphone, receiver, buzzer and the like.

Figure 2:
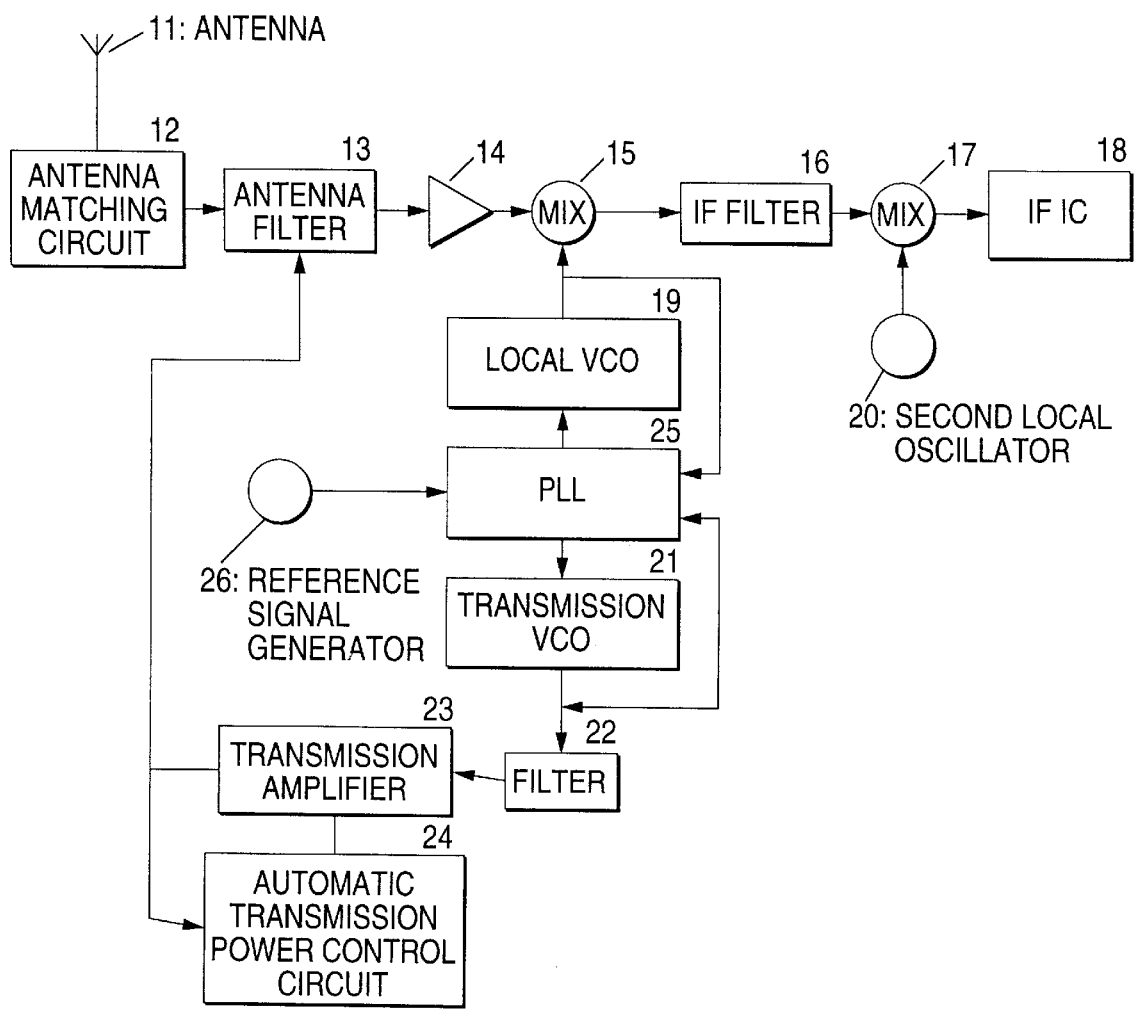
FIG. 2 is a block diagram showing an arrangement of a wireless unit of the multiple-modes adaptable telephone according to the present invention.

The wireless unit 2, as shown in FIG. 2, is made up of an antenna matching circuit 12, antenna filter 13, low noise amplifier 14, local VCO 19, first mixer 15, IF filter 16, second local oscillator 20, second mixer 17, IFIC 18, transmission VCO 21, filter 22, transmission amplifier 23, automatic transmission power control circuit 24, PLL 25, and reference signal generator 26. The antenna matching circuit 12 matches an impedance of the antenna to the subsequent circuitry to secure an efficient transmission/reception of a radio wave to and from the antenna. The antenna filter 13 guides a transmission signal to the antenna and a receiving signal to the circuitry subsequent to the filter. The low noise amplifier 14 amplifies a receiving signal. The local VCO (voltage controlled oscillator) 19 generates a local oscillation signal by its oscillation. The first mixer 15 mixes a receiving signal with a local oscillation signal received from the local VCO 19. The IF filter 16 filters out an unnecessary component of a first IF signal output from the first mixer 15. The second local oscillator 20 generates a second oscillation signal. The second mixer 17 mixes an output signal of the IF filter 16 with a second local oscillation signal output from the second local oscillator 20. The IFIC 18 converts an output signal of the second mixer 17 into a base band signal. The transmission VCO 21 generates a signal at a transmission frequency. The filter 22 removes an unnecessary component from the output signal of the transmission VCO 21. The transmission amplifier 23 amplifies a transmission signal. The automatic transmission power control circuit 24 controls a transmission power. The PLL (phase locked loop) 25 corrects the frequencies of the signals output from the local VCO 19 and the transmission VCO 21.

Figure 3:
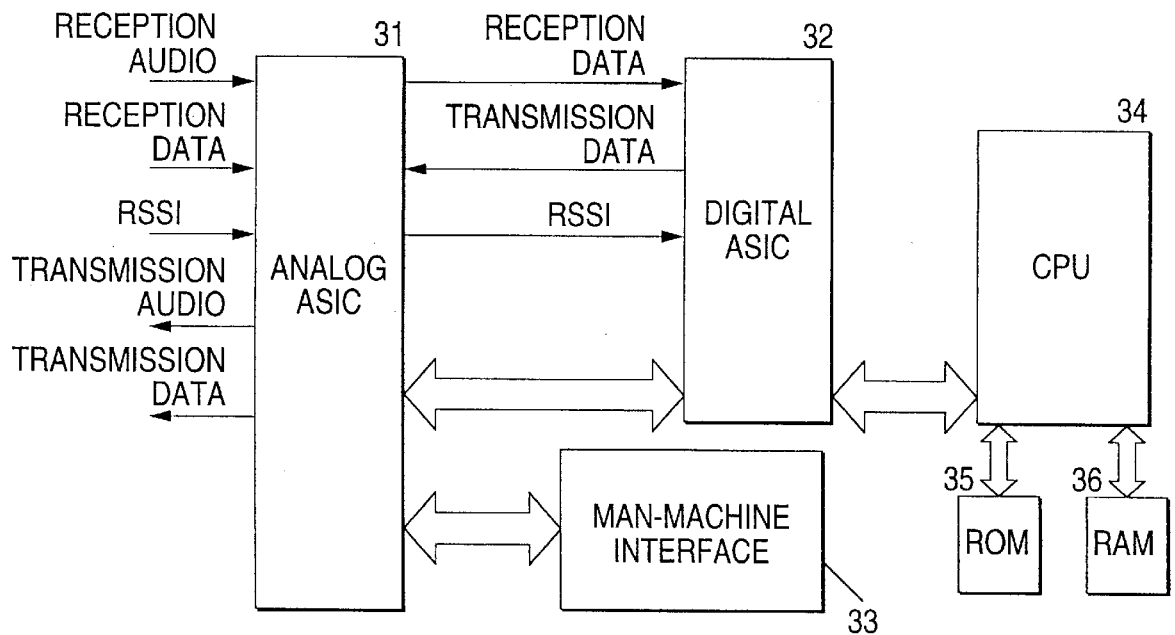
FIG. 3 is a block diagram showing an arrangement of a control unit of the multiple-modes adaptable telephone according to the present invention.
Figure 4:
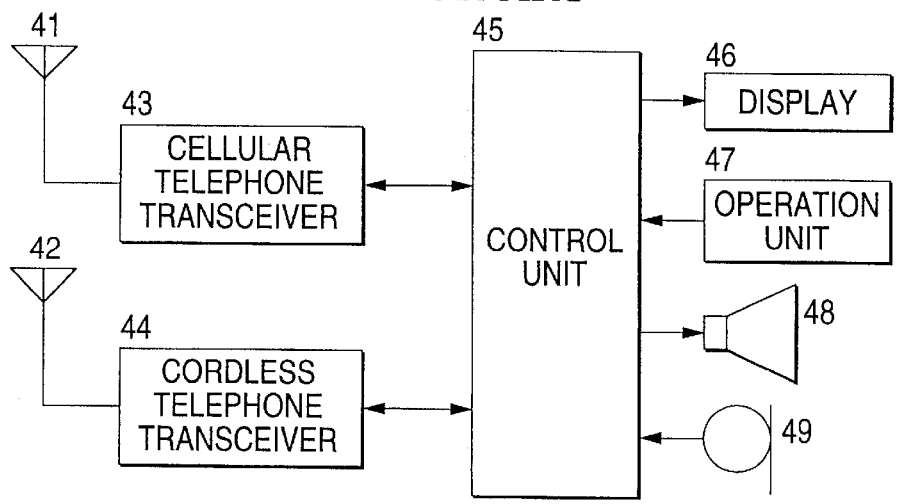
FIG. 4 is a block diagram showing a conventional multiphone-system telephone.

The control unit 3, as shown in FIG. 3, is made up of a analog ASIC (application specific integrated circuit) 31, digital ASIC 32, CPU 34, ROM 35, and RAM 36. The analog ASIC 31 transfers transmitting and receiving data to and from the man-machine interface 33, and carries out analog processings of the data. The digital ASIC 32 performs the digital processing of transmitting/receiving data. The CPU 34 controls the wireless unit 2 and the transferring of data. The ROM 35 stores programs of various communication modes. The RAM 36 provides a working area of the CPU 34.

The multiple-modes adaptable telephone of the present invention is adaptable to an AMPS (advanced mobile phone service) cellular system as a cellular telephone system, a PCS (personal communication system) according to IS-94 as a personal communication system, and a cordless telephone system using the ISM (industrial scientific and medical equipment) frequency band as a cordless telephone system.

According to the FCC (federal communications commission) rules, the frequency bands of AMPS and IS-94 are: 824.04 MHz to 849.97 MHz (transmission) and 869.04 MHz to 893.97 MHz (reception). The ISM frequency bands for reception and transmission, prescribed also by the FCC, are each within the range of 902 MHz to 928 MHz.

The multiple-modes adaptable telephone according to the present invention uses the ISM frequency band for the cordless telephone system. Therefore, the frequency bands of the cellular telephone system and the personal communication system are located close to those of the cordless system. This allows a single antenna and a single wireless transceiver to be used in common for those communication systems. In this case, the antenna matching circuit 12 and the antenna filter 13 in the wireless unit 2 must be designed to allow the signals of the above frequencies to pass therethrough at low losses and to satisfactorily attenuate spurious components, respectively. The local VCO 19 for generating the signal of the first local frequency and the transmission VCO 21 for generating the signal of the transmission frequency must be capable of providing frequency bands broad enough to avoid the deterioration of radio performances, such as carrier/noise ratio and output level.

This, designed according to the IS-94 protocol, is stored in the ROM 35. When the telephone of the invention is in a PCS mode, it places a telephone call to a base station based on the IS-94 and performs a personal communication with a called telephone by way of the base station.

An operation of the multiple-modes adaptable telephone will be described hereinafter.

When a user designates a communication mode, the CPU 34 of the control unit 3 controls the hardware of the wireless unit 2 and the control unit 3 to execute the designated mode.

The antenna 11 receives a radio wave from a base station or a master station, or transmits a radio wave into the free space.

For reception, a receiving signal is received by the antenna 11, passed through the antenna filter 13, and received by the low noise amplifier 14. The signal is amplified by the low noise amplifier 14 and input to the first mixer 15 where it is mixed with a signal derived from the local VCO 19 into a first IF signal. The IF signal is passed through the IF filter 16 which-filters out an undesired component of the IF signal. The IF signal is then applied to the second mixer 17 where it is mixed with a second local signal from the second local oscillator 20. The resultant signal is led to the IFIC 18. In the IFIC, the audio signal and data signal contained in the received signal are converted into a base band signal, which in turn is subjected to processes by the control unit 3.

For transmission, a transmission sound signal and a base band signal are applied from the control unit 3 to the transmission VCO 21 where it modulates a transmission carrier signal. The modulated signal from the transmission VCO 21 is applied to the filter 22 which, in turn, filters out an undesired component of the modulated signal, and then amplified by the transmission amplifier 23, and passed through the antenna filter 13 and the antenna matching circuit 12, and finally radiated into the free space from the antenna 11. The automatic transmission power control circuit 24 receives a control voltage necessary for generating a necessary electric power, compares it with an output of the transmission amplifier 23, and controls a mu-factor of the transmission amplifier 23 to thereby stabilize the transmission power.

The control unit 3, located between the wireless unit 2 and the man-machine interface 4, performs analog and digital processings, controls the wireless unit 2 and the man-machine interface 4 in accordance with software instructions.

The analog ASIC 31 performs the waveform processing of the audio signal and the data, which are derived from the wireless unit 2, and transfers those signals to be digitally processed to the digital ASIC 32, and the audio signals and the signals on the man-machine interface 4 to the man-machine interface 33 including the buzzer, microphone, and speaker.

The digital ASIC 32 carries out a digital process of data necessary for communication, and transmits and receives the data under control of the CPU 34.

The CPU 34 controls the hardware of the control unit 3 and the wireless unit 2 on the basis of the software stored in the ROM 35, and executes the transmitting and receiving sequences of each communication sequence.

Through the above-mentioned operations, the multiple-modes adaptable telephone embodying the invention performs the communications modes of the AMPS cellular telephone system, IS-94 basis personal communication system, and ISM band cordless telephone system.

As seen from the foregoing description, according to the present invention, the telephone functions based on the specifications of plural types of telephones are realized by a single wireless transceiver. Therefore, the size and weight of the telephone, and the cost to manufacture can be reduced.

Further, the invention enables a single telephone terminal to use many telephone services at many places, for example, home, office and car. This is very convenient for telephone users.

What is claimed is:

1. A multiple-modes adaptable radiotelephone which is adapted for use in multiple communication modes, and which is communicable with any of cellular telephone system, cordless telephone system, and PCS telephone system, comprising:

a single wireless transceiver for modulating and demodulating signals in a transmitting/receiving frequency band of a cellular telephone system and a cordless telephone system, said cordless telephone system transmitting/receiving frequency band being located close to the transmitting/receiving frequency band of the cellular telephone system;

a control unit for controlling said wireless transceiver; and a PCS software being installed in said control unit.

2. The multiple-modes adaptable radiotelephone according to claim 1, wherein:

said wireless transceiver modulates and demodulates signals in the transmitting/receiving frequency bands of an AMPS cellular telephone and an ISM band cordless telephone, and said PCS software is designed according to IS-94.

\* \* \* \* \*